(12) United States Patent
Chen

(10) Patent No.: US 7,161,307 B2
(45) Date of Patent: Jan. 9, 2007

(54) POWER FACTOR CORRECTION APPARATUS WITH EMBEDDED DC—DC CONVERTER

(75) Inventor: Chi-Jen Chen, Taoyuan (TW)

(73) Assignee: Benq Corporation, Taoyuan Shien (TW)

( * ) Notice: Subject to any disclaimer, the term of this patent is extended or adjusted under 35 U.S.C. 154(b) by 147 days.

(21) Appl. No.: 11/006,654

(22) Filed: Dec. 8, 2004

(65) Prior Publication Data
US 2005/0128778 A1 Jun. 16, 2005

(30) Foreign Application Priority Data
Dec. 12, 2003 (TW) .............................. 92135288 A

(51) Int. Cl.
*H05B 41/16* (2006.01)
(52) U.S. Cl. .................. 315/247; 315/307; 315/291; 315/224; 315/209 R; 315/278; 363/108; 363/109; 363/123; 363/125
(58) Field of Classification Search ............... 315/247, 315/224, 291, 307, 254, 276, 257, 278, 272, 315/209 R, 290; 363/77, 81, 37, 123, 125, 363/133, 108, 109; 323/207; 307/82
See application file for complete search history.

(56) References Cited

U.S. PATENT DOCUMENTS 5,982,645 A * 11/1999 Levran et al. ................ 363/37
6,731,524 B1 * 5/2004 Elek et al. .................... 363/70

* cited by examiner

*Primary Examiner*—Haissa Philogene
(74) *Attorney, Agent, or Firm*—Rabin & Berdo, P.C.

(57) ABSTRACT

A power factor correction apparatus with an embedded direct-current to direct-current (DC-DC) converter is provided. The apparatus includes a power factor controller, a high-voltage adapter and a low-voltage adapter. The power factor controller, which receives an AC power source, includes a transformer. The secondary side of the transformer includes a first sub-coil and a second sub-coil for outputting a first power source and a second power source respectively. The high-voltage adapter converts the first power source into a high DC power source. The low-voltage adapter converts the second power source into a first DC power source. The power factor controller corrects the power factor of the power factor correction apparatus according to the first DC power source.

27 Claims, 4 Drawing Sheets

POWER FACTOR CORRECTION APPARATUS WITH EMBEDDED DC—DC CONVERTER

This application claims the benefit of Taiwan application Serial No. 92135288, filed Dec. 12, 2003, the subject matter of which is incorporated herein by reference.

BACKGROUND OF THE INVENTION

1. Field of the Invention

The invention relates in general to a power correction factor (PFC) apparatus, and more particularly to a PFC apparatus with an embedded DC-DC converter.

2. Description of the Related Art

Ordinary display apparatus, such as cathode-ray tube (CRT) display or liquid crystal display (LCD), can only provide an image up to 30–40 inches wide and is not convenient to carry with due to huge size. The projector, which is capable of outputting an image up to tens or hundreds inches wide and is much smaller than that of a CRT display or an LCD, outdoes the CRT display and the LCD in terms of entertainment purpose or business briefing.

FIG. 1 is a block diagram of a projector of prior art. A projector 100 comprises a power factor controller 110, a direct-current to direct-current (DC-DC) conversion circuit 120, a lamp-ignition circuit 130, a control circuit 140, and a lamp 150. The power factor controller 110 and the DC-DC conversion circuit 120 are power suppliers of the projector 100. The power factor controller 110 supplies a high-voltage DC power source of about 380V to the lamp-ignition circuit 130 and a high-voltage DC power source of about 380V of to the DC-DC conversion circuit 120. The lamp-ignition circuit 130, an electronic ballast for instance, is for igniting and providing power to the lamp 150. The DC-DC conversion circuit 120, such as an isolated fly-back circuit, provides a DC power source of 12V, 5V or 3.3V for the control circuit 140 to use. The control circuit 140 is for controlling the operation of the projector 100.

Along with the advance in technology, the projector is also becoming smaller, lighter, slimmer and shorter to give the user a better portability. Therefore, miniaturization has always been an important object for the manufacturer to achieve.

SUMMARY OF THE INVENTION

It is therefore an object of the invention to provide a power factor correction (PFC) apparatus with an embedded DC-DC converter for reducing the size of a projector.

According to the object of the invention, a PFC apparatus comprising a power factor controller, a high-voltage rectifier, and a low-voltage rectifier is provided. The power factor control apparatus, which is receives an alternating-current (AC) power source, comprises a rectifier. The secondary side of the transformer has a first coil for outputting a first power source according to an AC power source and a second coil for outputting a second power source according to the AC power source. The high-voltage rectifier receives and converts the first power source into a high-voltage direct-current (DC) power source. The low-voltage rectifier receives and converts the second power source into a first DC power source. The power factor controller corrects the power factor of the PFC apparatus according to the first DC power source.

Other objects, features, and advantages of the invention will become apparent from the following detailed description of the preferred but non-limiting embodiments. The following description is made with reference to the accompanying drawings.

DETAILED DESCRIPTION OF THE INVENTION

The power supply circuit of a conventional projector comprises a power factor correction (PFC) apparatus and a DC-DC conversion circuit. The invention has the DC-DC conversion circuit embedded in the PFC apparatus to reduce the size of the power supply circuit of the projector so that the projector volume can be reduced.

Figure 1:
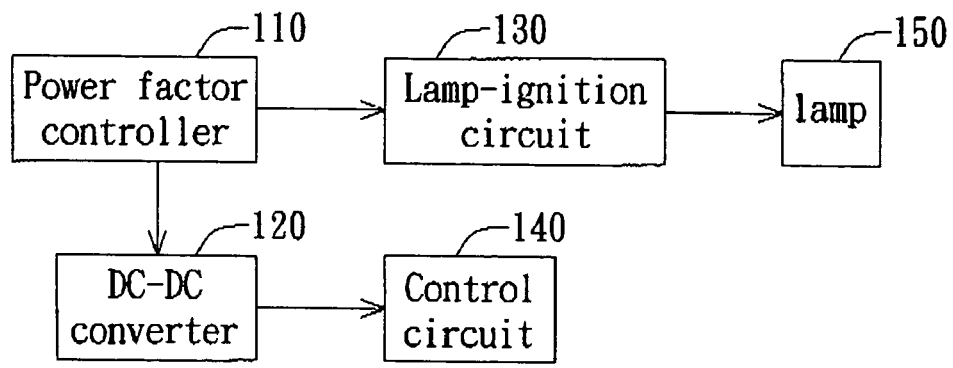
FIG. 1 is a block diagram of a projector of prior art.
Figure 2:
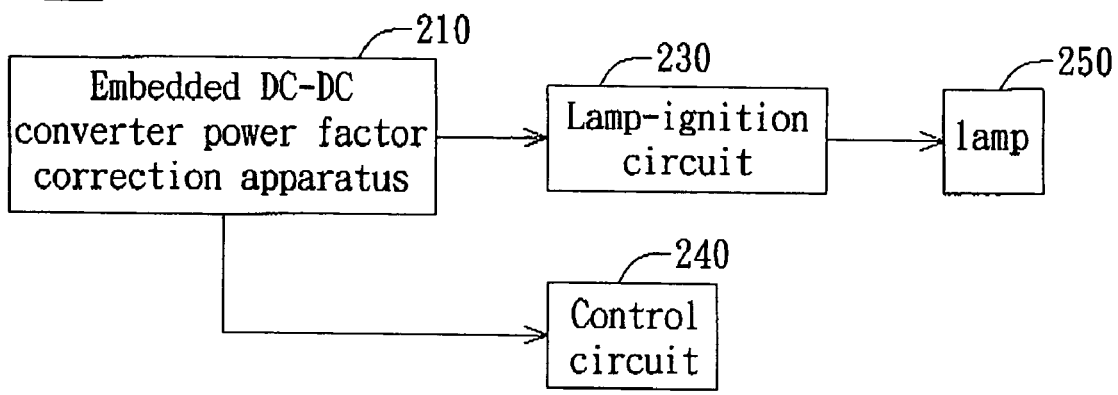
FIG. 2 is a block diagram of a projector according to a preferred embodiment of the invention.

FIG. 2 is a block diagram of a projector according to a preferred embodiment of the invention. A projector 200 comprises a PFC apparatus 210 with an embedded DC-DC converter, a lamp-ignition circuit 230, a control circuit 240, and a lamp 250. The PFC apparatus 210, which is the power supplier of the projector 200, supplies a high-voltage direct-current (DC) power source of about 380V to the lamp-ignition circuit 230, and supplies a DC power source, a DC power source of 12V, 5V or 3.3V for instance, for the control circuit 240 to operate the control circuit 240 with. The lamp-ignition circuit 230, an electronic ballast for instance, is for switching on the lamp 250. The control circuit 240 is for controlling the operation of the projector 200.

Figure 3:
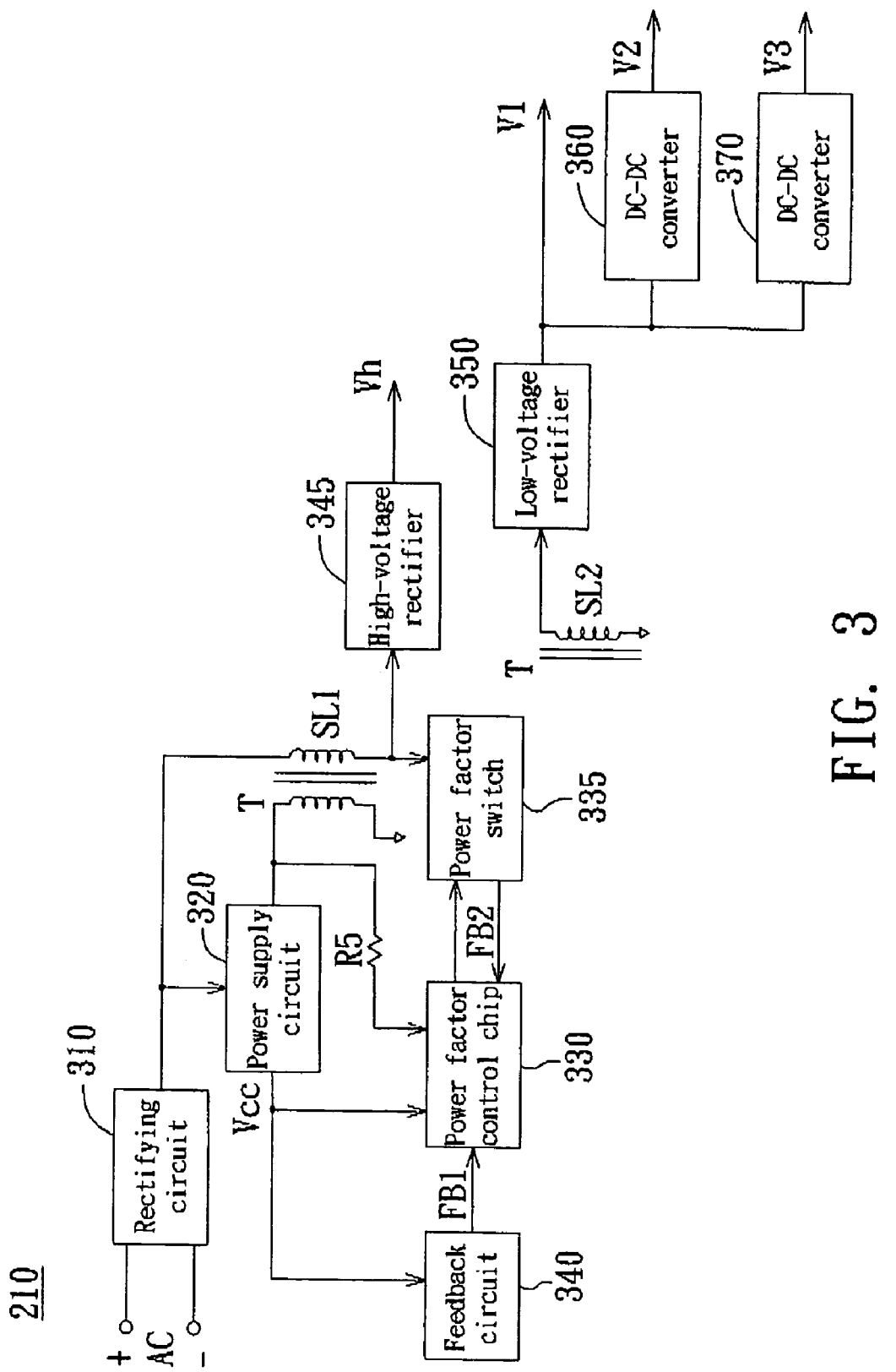
FIG. 3 is a block diagram of a PFC apparatus with an embedded DC-DC converter.

FIG. 3 is a block diagram of a PFC apparatus with an embedded DC-DC converter. The PFC apparatus 210 with an embedded DC-DC converter comprises a power factor controller, a high-voltage rectifier 345, a low-voltage rectifier 350, a DC-DC converter 360, and a DC-DC converter 370. The power factor controller comprises a rectifying circuit 310, a power supply circuit 320, a transformer T, a power factor control chip 330, a power factor switch 335, a sensing resistor R5, and a feedback circuit 340. The rectifying circuit 310 is for receiving and converting an alternating-current (AC) power source AC into a DC power source, and then outputs the DC power source. The power supply circuit 320, after receiving the DC power source outputted by the rectifying circuit 310, converts the DC power source into a DC power source Vcc, which supplies power for the power factor control chip 330 and the feedback circuit 340. The transformer T comprises a primary side coil and a secondary side coil, wherein the secondary side coil comprises sub-coils SL1 and SL2. The power factor control chip 330 receives the primary side voltage of the transformer T through a sensing resistor R5, and receives a feedback signal FB1 of the feedback circuit 340 as well as a feedback signal FB2 of the power factor switch 335 for controlling the power factor switch 335 accordingly so as to improve the power factor.

The high-voltage rectifier 345 receives the output of the sub-coil SL1 disposed on the secondary side of the transformer T and accordingly outputs a high-voltage DC power source Vh to the lamp-ignition circuit 230. The value of the high-voltage DC power source Vh can be a DC power source of 380V for instance.

The low-voltage rectifier 350 receives the output of the sub-coil SL2 disposed on the secondary side of the transformer T and accordingly outputs a DC power source V1. The value of DC power source V1 can be 12V for instance. Moreover, the DC power source V1 is fed back to the feedback circuit 340 for the power factor control chip 330 to control the power factor value accordingly.

The DC-DC converter 360 receives and reduces a DC power source V1 to a DC power source V2, then outputs the DC power source V2. The value of the DC power source V2 can be 5V for instance. The DC-DC converter 370 receives and reduces a DC power source V1 to a DC power source V3, then outputs the DC power source V3. The value of the DC power source V3 can be 3.3V for instance. The DC power sources V1, V2 and V3 supply power for the control circuit 240 to operate.

Figure 4:
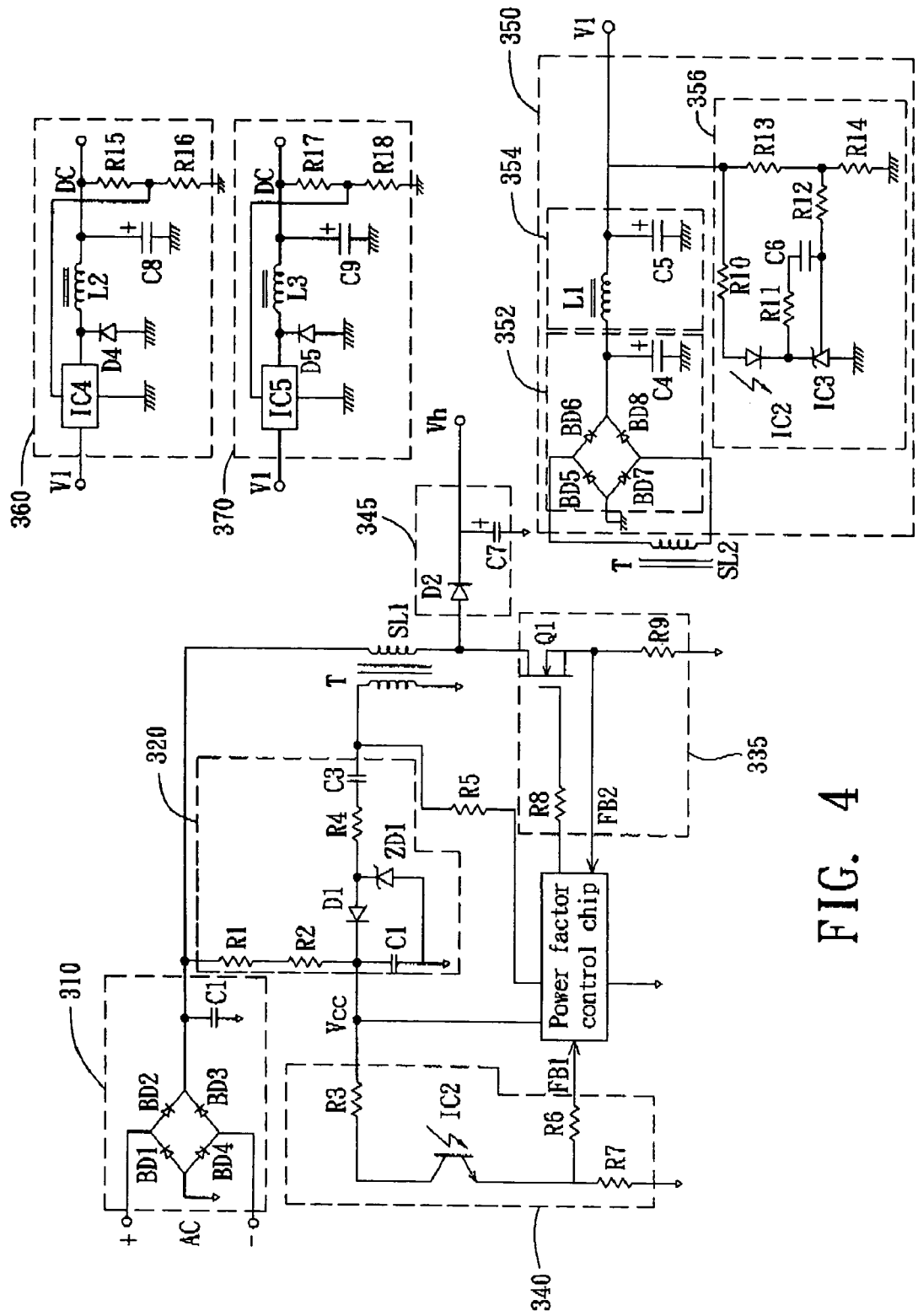
FIG. 4 is a circuit diagram of a PFC apparatus with an embedded DC-DC converter.

FIG. 4 is a circuit diagram of a PFC apparatus with an embedded DC-DC converter. The rectifying circuit 310, such as a full-wave rectifying circuit illustrated in the diagram, comprises a capacitor C1 and four diodes namely BD1, BD2, BD3, and BD4. The power supply circuit 320, which provides a DC power source Vcc to the power factor control chip, comprises resistors R1, R2, and R4, a diode D1, capacitors C2, C3, a zener diode ZD1. The feedback circuit 340, which comprises resistors R3, R6, and R7 and a photo-coupler IC2, is for outputting the feedback signal FB1 to the power factor control chip 330 according to the DC power source V1 outputted by the low-voltage rectifier 350. The power factor switch 335 comprises a transistor Q1 and resistors R8 and R9. The voltage value of the drain electrode of the transistor Q1 is the feedback signal FB2. The power factor control chip 330 controls the conductivity of the transistor Q1 through the resistor R8 according to the feedback signals FB1 and FB2. When the transistor Q1 is conducted, power is saved in the transformer T; when the transistor Q1 is disconnected, the transformer T releases power energy to the high-voltage rectifier 345 and the low-voltage rectifier 350. The high-voltage rectifier 345, a half-wave rectifying circuit for instance, comprising a diode D2 and a capacitor C7, is for converting the output of the sub-coil SL1 of the transformer T into a high-voltage DC power source Vh.

The low-voltage rectifier 350 comprises a rectifying unit 352, a filtering unit 354 and a feedback unit 356. The low-voltage rectifier 350 receives the output of the sub-coil SL2 disposed on the secondary side of the transformer T, and then outputs the DC power source V1 through the rectifying unit 352 and the filtering unit 354. The rectifying unit 352, a full-wave rectifying circuit for instance, comprises a capacitor C4 and diodes BD5, BD6, BD7, and BD8. The filtering circuit 354 comprises an inductor L1 and a capacitor C5. The DC power source V1 is fed back to the power factor control chip 330 as a reference for power factor correction through the feedback unit 356 and the feedback circuit 340. The feedback unit 356 comprises resistors R10, R11, R12, R13 and R14, a capacitor C6, a voltage-stabilizing chip IC3 and a photo-coupler IC2. The feedback unit 356 feedbacks the value of the DC power source V1 through the photo-coupler IC2 lest the stability of the DC power source V1 might be affected.

The DC-DC converter 360, a buck converter for instance, comprises a step-down stabilizing circuit such as an exchange-type voltage-stabilizing chip IC4, a diode D4, an inductor L2, a capacitor C8, and resistors R15 and R16 for reducing the DC power source V1 to the DC power source V2. The DC-DC converter 370, a buck converter for instance, comprises a step-down stabilizing circuit such as an exchange-type voltage-stabilizing chip IC5, a diode D5, an inductor L3, a capacitor C9, and resistors R17 and R18 for reducing the DC power source V1 to a DC power source V3.

Figure 5A:
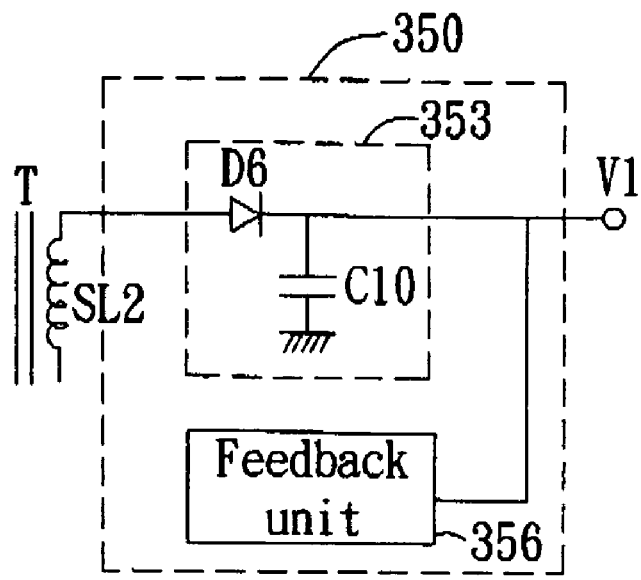
FIG. 5A is a circuit diagram of low-voltage rectifier 350 in another preferred embodiment.

FIG. 5A is a circuit diagram of low-voltage rectifier 350 in another preferred embodiment. The low-voltage rectifier 350 comprises a rectifying unit 353 and a feedback unit 356. The rectifying unit 353, which is a half-wave rectifying circuit, comprises a diode D6 and a capacitor C10. The circuit of the low-voltage rectifier illustrated in FIG. 5A is simpler and costs less than that illustrated in FIG. 4.

Figure 5B:
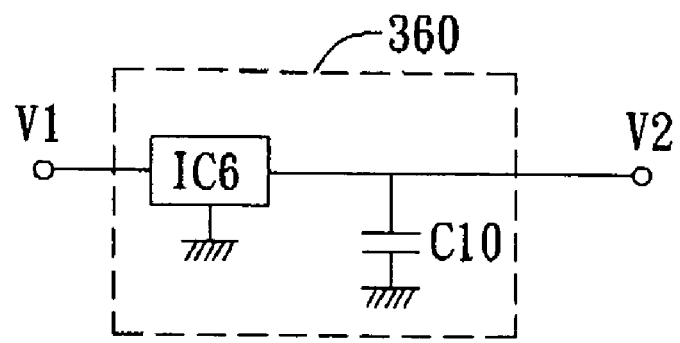
FIG. 5B is a circuit diagram of DC-DC converter 360 in another preferred embodiment.

FIG. 5B is a circuit diagram of DC-DC converter 360 in another preferred embodiment. The DC-DC converter 360 comprises a serial-type linear voltage-stabilizing chip IC6 and a capacitor C10 for reducing the DC power source V1 to the DC power source V2.

The low-voltage rectifying circuit and the DC-DC converter of the PFC apparatus disclosed in the above preferred embodiment of the invention can adopt various circuits disclosed above according to the consideration of cost. The PFC apparatus adopts an embedded DC-DC converter, so that the power supply circuit of the projector is reduced and that the projector volume is reduced accordingly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power factor correction (PFC) apparatus, comprising:
   a power factor controller for receiving an alternating-current (AC) power source and comprising:
      a transformer whose secondary side comprising:
         a first sub-coil for outputting a first power source according to the alternating-current power source;
         a second sub-coil for outputting a second power source according to the AC power source;
   a high-voltage rectifier electrically connecting to the first sub-coil for receiving and converting the first power source into a high-voltage direct-current (DC) power source; and
   a low-voltage rectifier electrically connected to the second sub-coil for receiving and converting the second power source into a first DC power source;
   wherein, the power factor controller corrects the power factor of the PFC apparatus according to the first DC power source.

2. The PFC apparatus according to claim 1, wherein the PFC apparatus further comprises:
   a first DC-DC converter receiving and reducing the voltage of the first DC power source and outputting a second DC power source; and
   a second DC-DC converter receiving and reducing the voltage of the first DC power source and outputting a third DC power source.

3. The PFC apparatus according to claim 2, wherein the first DC-DC converter comprises a step-down stabilizing circuit and a filtering circuit for outputting the second DC power source.

4. The PFC apparatus according to claim 2, wherein the second DC-DC converter comprises a step-down stabilizing circuit and a filtering circuit for outputting the third DC power source.

5. The PFC apparatus according to claim 1, wherein the power factor controller further comprises a feedback circuit for outputting a feedback signal and the power factor controller according to the first DC power source, the PFC apparatus correcting the power factor according to the feedback signal.

6. The PFC apparatus according to claim 5, wherein the feedback signal is fed back to the power factor controller through a photo-coupler.

7. The PFC apparatus according to claim 1, wherein the high-voltage rectifier is selectively a half-bridge type rectifying circuit and a full-bridge type rectifying circuit.

8. The PFC apparatus according to claim 1, wherein the low-voltage rectifier selectively comprises a half-bridge type rectifying circuit and a full-bridge type rectifying circuit.

9. The PFC apparatus according to claim 1, wherein the apparatus is applied in a projector.

10. The PFC apparatus according to claim 9, wherein the high-voltage DC power source supplies power to an electronic ballast.

11. A power factor correction (PFC) apparatus with a DC-DC converter, wherein the PFC apparatus comprises:
a power factor controller for receiving an AC power source, comprising:
a transformer whose secondary side comprising:
a first sub-coil for outputting a first power source according to the AC power source;
a second sub-coil for outputting a second power source according to the AC power source;
a high-voltage rectifier electrically connecting to the first sub-coil for receiving and converting the first power source into a high-voltage DC power source;
a low-voltage rectifier electrically connecting to the second sub-coil for receiving and converting the second power source into a first DC power source;
a first DC-DC converter receiving and reducing the voltage of the first DC power source outputting a second DC power source; and
a second DC-DC converter receiving and reducing the voltage of the first DC power source outputting a third DC power source;
wherein the power factor controller corrects the power factor of the PFC apparatus according to the first DC power source.

12. The PFC apparatus according to claim 11, wherein the first DC-DC converter comprises a step-down stabilizing circuit and a filtering circuit for outputting the second DC power source.

13. The PFC apparatus according to claim 11, wherein the second DC-DC converter comprises a step-down stabilizing circuit and a filtering circuit for outputting the second DC power source.

14. The PFC apparatus according to claim 11, wherein the power factor controller further comprises a feedback circuit for outputting a feedback signal according to the first DC power source, the PFC apparatus correcting the power factor of according to the feedback signal.

15. The PFC apparatus according to claim 14, wherein the feedback signal is fed back to the power factor controller through a photo-coupler.

16. The PFC apparatus according to claim 11, wherein the high-voltage rectifier is selectively a half-bridge type rectifying circuit and a full-bridge type rectifying circuit.

17. The PFC apparatus according to claim 11, wherein the low-voltage rectifier selectively comprises a half-bridge type rectifying circuit and a full-bridge type the rectifying circuit.

18. The PFC apparatus according to claim 11, wherein the apparatus is applied in a projector.

19. The PFC apparatus according to claim 18, wherein the high-voltage DC power source supplies power to an electronic ballast.

20. A projector with a PFC apparatus having a DC-DC converter, the projector comprising:
a lamp;
a control circuit for controlling the operation of the projector;
a lamp-ignition circuit for supplying a voltage source to the lamp;
a power factor controller for receiving an AC power source and comprising:
a transformer whose secondary side comprising:
a first sub-coil for outputting a first power source according to the AC power source;
a second sub-coil for outputting a second power source according to the AC power source;
a high-voltage rectifier electrically connecting to the first coil for receiving and converting the first power source into a high-voltage DC power source for supplying to the lamp-ignition circuit; and
a low-voltage rectifier electrically connecting to the second coil for receiving and converting the second power source into a first DC power source for supplying to the control circuit;
wherein the power factor controller corrects the power factor of the PFC apparatus according to the first DC power source.

21. The projector according to claim 20, the DC-DC converter further comprising:
a first DC-DC converter for receiving and reducing the voltage of the first DC power source and outputting a second DC power source; and
a second DC-DC converter for receiving and reducing the voltage of the first DC power source and outputting a third DC power source.

22. The projector according to claim 21, wherein the first DC-DC converter comprises a step-down stabilizing circuit and a filtering circuit for outputting the second DC power source.

23. The projector according to claim 21, wherein the second DC-DC converter comprises a step-down stabilizing circuit and a filtering circuit for outputting the second DC power source.

24. The projector according to claim 20, the power factor controller further comprising a feedback circuit for outputting a feedback signal according to the first DC power source, the power factor controller correcting the power factor according to the feedback signal.

25. The projector according to claim 24, wherein the feedback signal is fed back to the power factor controller through a photo-coupler.

26. The projector according to claim 20, wherein the high-voltage rectifier is selectively a half-bridge type rectifying circuit and a full-bridge type rectifying circuit.

27. The projector according to claim 20, wherein the low-voltage rectifier selectively comprises a half-bridge type rectifying circuit and a full-bridge type rectifying circuit.

* * * * *